United States Patent [19]
de Koe et al.

[11] 3,729,717
[45] Apr. 24, 1973

[54] INFORMATION BUFFER FOR CONVERTING A RECEIVED SEQUENCE OF INFORMATION CHARACTERS

[75] Inventors: Oscar Bernardus Philomenus Rikkert de Koe; Ludwig Desire Johan Eggermont, both of Emmasingel, Eindhoven, Netherlands

[73] Assignee: U.S. Philips Corporation, New York, N.Y.

[22] Filed: July 22, 1971

[21] Appl. No.: 165,013

[30] Foreign Application Priority Data

July 25, 1970 Netherlands ........................7011048

[52] U.S. Cl. ............................340/172.5, 179/15 BS
[51] Int. Cl. ............................G08c 13/00, H04j 3/06
[58] Field of Search..................................340/172.5; 178/69.5 R; 179/15 BS

[56] References Cited

UNITED STATES PATENTS

| | | | |
|---|---|---|---|
| 3,531,777 | 9/1970 | West | 340/172.5 |
| 3,597,552 | 8/1971 | Goto | 179/15 BS |
| 3,389,381 | 6/1968 | Foster | 340/172.5 |
| 3,418,637 | 12/1968 | Humphrey | 340/172.5 |
| 3,557,308 | 1/1971 | Alexander et al. | 178/69.5 |

*Primary Examiner*—Harvey E. Springborn
*Attorney*—Frank R. Trifari

[57] ABSTRACT

An information buffer unit, comprising a random access store, for converting a received character sequence into a character sequence which is synchronous with an independent clock, for example, for use in digital telecommunication networks.

3 Claims, 4 Drawing Figures

Patented April 24, 1973 3,729,717

3 Sheets-Sheet 1

Figure 1:
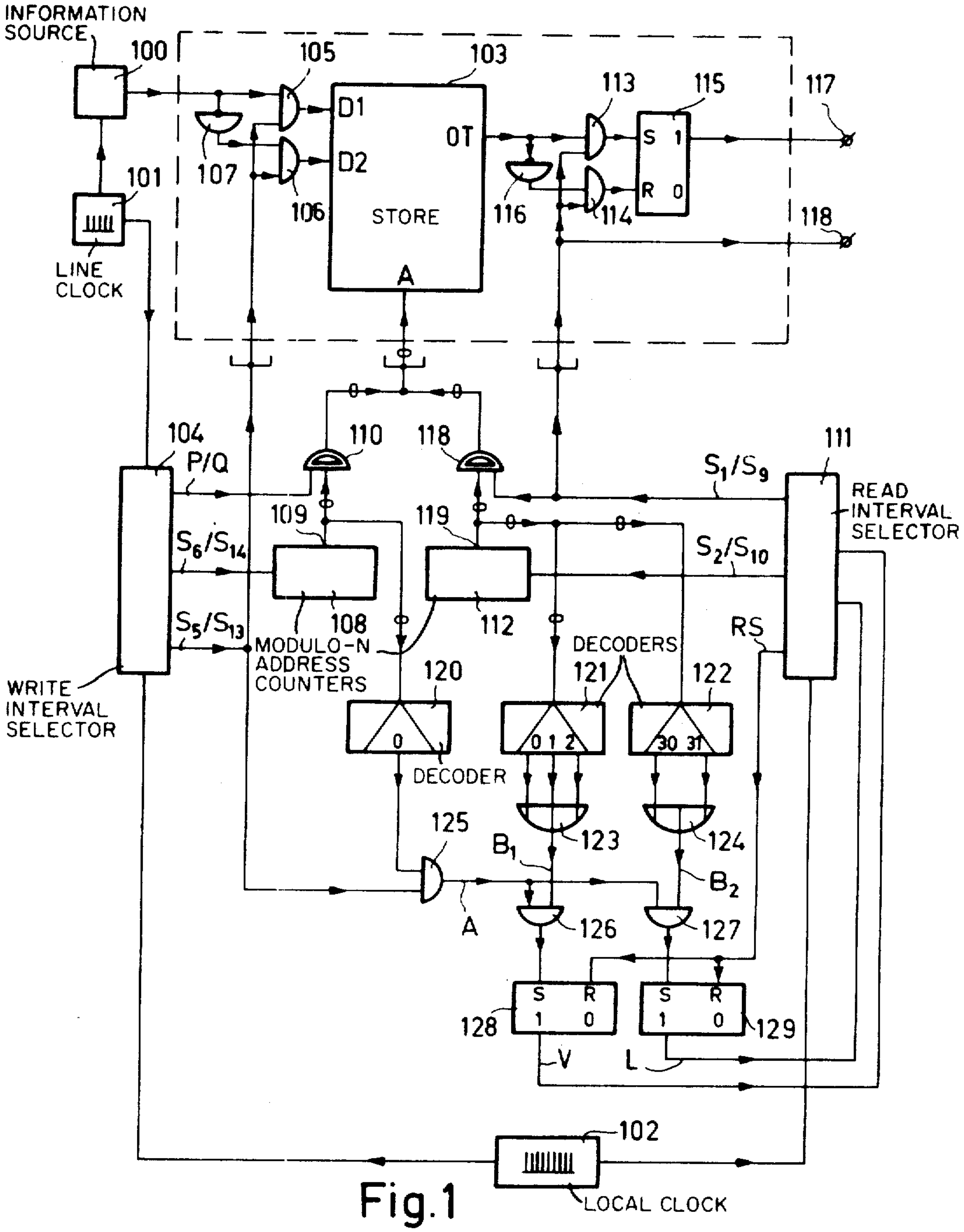

INVENTORS
OSCAR B.PH. RIKKERT DE KOE
LUDWIG D.J. EGGERMONT

BY

AGENT

INVENTORS
OSCAR B.PH. RIKKERT DE KOE
LUDWIG D.J. EGGERMONT
BY
Frank R. [signature]
AGENT

INVENTORS
OSCAR B.PH. RIKKERT DE KOE
LUDWIG D.J. EGGERMONT

BY [signature]
AGENT

INFORMATION BUFFER FOR CONVERTING A RECEIVED SEQUENCE OF INFORMATION CHARACTERS

The invention relates to an information buffer unit for converting a received sequence of information characters which is synchronous with a received clock signal into a sequence which is synchronous with a first control signal derived from an independent clock, comprising a group of store locations, in each of which an information character can be stored, a first selective transmission unit, comprising a first cyclic address generator for selecting the store locations in the same sequence in each cycle and for transferring the information characters of the received sequence of information characters to the selected store locations, a a second selective transmission unit, comprising a second cyclic address generator for selecting the store locations in each cycle in the same sequence as the first cyclic address generator and for transferring the information characters from the store locations to an output of the information buffer unit, a first control unit for controlling the first selective transmission unit and a second control unit for deriving the first control signal from the clock in order to control the second selective transmission unit.

In known information buffer units of this kind the input or writing of the information characters into the store locations is controlled by the received clock signal. This signal has an uncontrolled phase with respect to the independent clock so that for writing and reading information characters use is to be made of separate address decoding units for decoding the addresses generated by the cyclic address generators.

The invention has for its object to provide an information buffer unit of the kind set forth in which the input of the information characters into the store locations is controlled by a control signal having a controlled phase with respect to the clock. This offers the advantages that the two selective transmission units can make use of one common address decoding unit. The information buffer unit according to the invention is characterized in that the first control unit is adapted to derive a second control signal from the clock in order to control the first selective transmission unit and comprises a first phase-comparison unit for comparing the phase of the received clock signal with the phase of the second control signal and a phase-correction unit for introducing, in dependence upon the phase difference detected by the first phase-comparison unit, discrete variations in the phase of the second control signal so as to keep the phase difference between the second control signal and the received clock signal within given limits.

Figure 2:
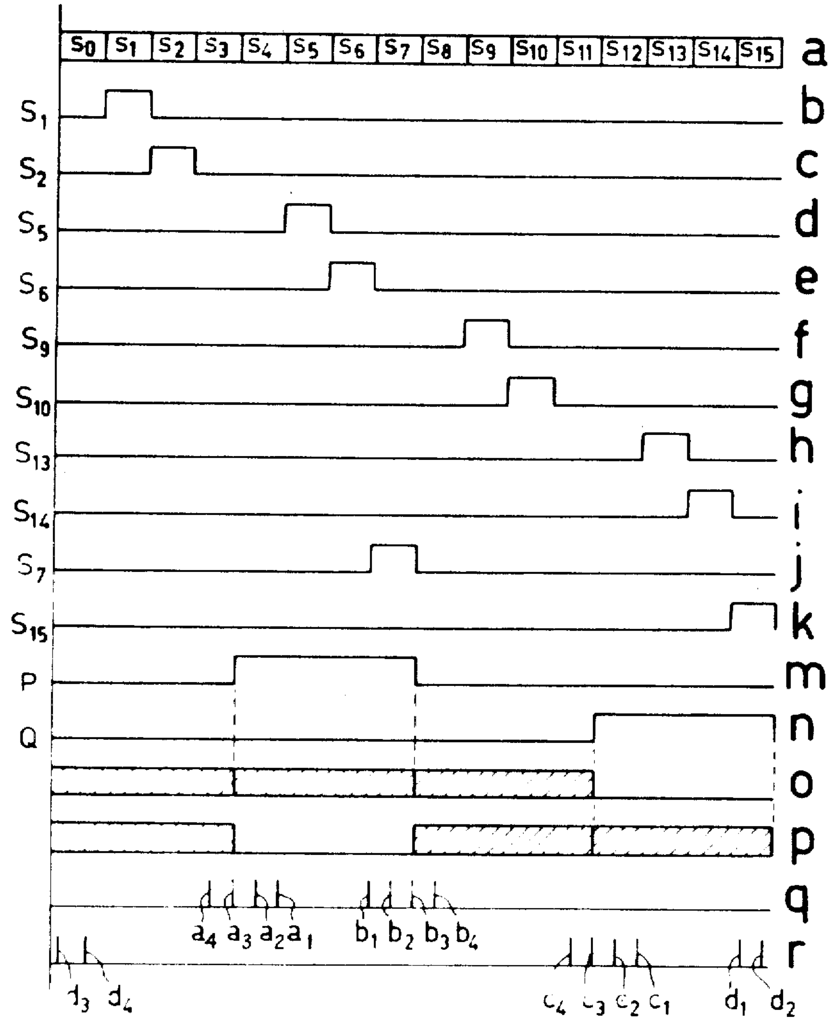
Figure 3:
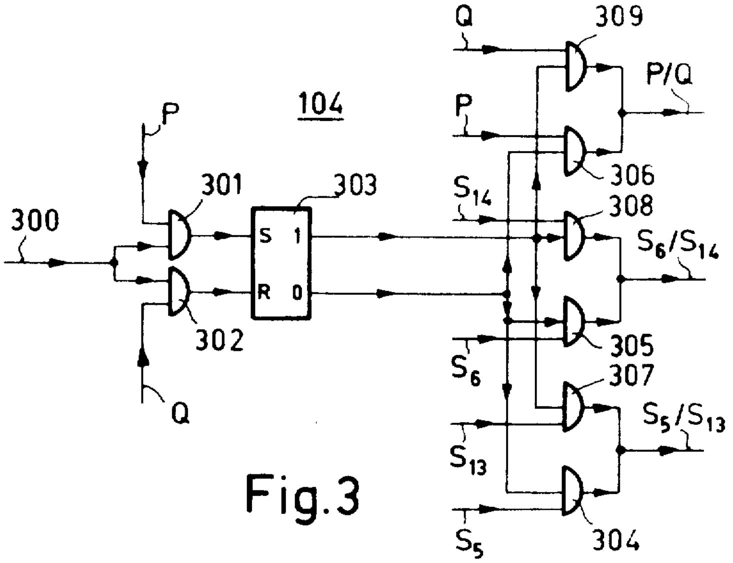
Figure 4:
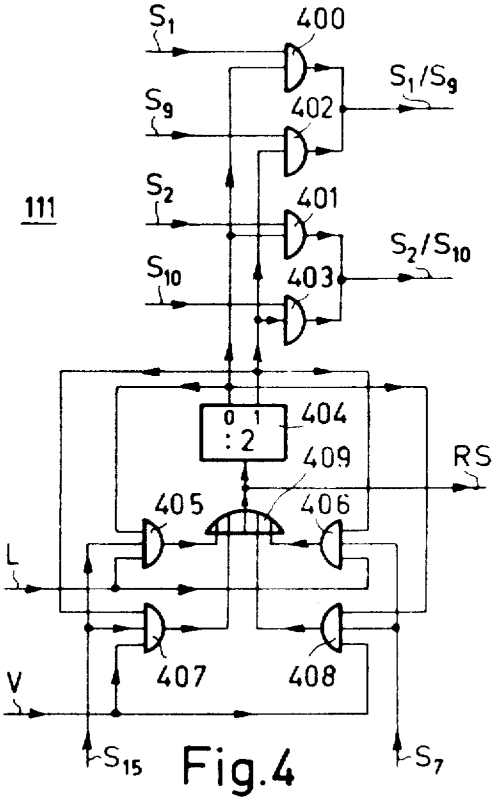

In order that the invention may be readily carried into effect, one embodiment thereof will now be described in detail, by way of example, with reference to the accompanying diagrammatic drawings, in which:

FIG. 1 shows the block diagram of an embodiment of the information buffer unit according to the invention, FIG. 2 shows the waveform of a number of local clock signals occurring in the unit shown in FIG. 1, FIG. 3 shows an embodiment of a write-interval selector, and FIG. 4 shows an embodiment of a read-interval selector.

In FIG. 1, the reference 100 denotes a source of information characters and the reference 101 denotes a clock associated with the source. In many applications the source 100 is formed by the terminal unit of a transmission system for the transmission of information characters through a transmission line. In conformity therewith, the terms source and line are used side by side for denoting the source of information characters. The clock unit 101 will hereinafter be referred to as line clock.

The line supplies a sequence of information characters. Each character is situated in a given line time interval. The series of all line time intervals constitutes the line time scale. The line clock supplies a nominal, equidistant sequence of line clock pulses, the periods of which determine the line time intervals. The line clock synchronizes the source 100 such that the latter supplies the information characters in the line clock pulse periods. The line clock pulses can be derived from a clock signal which transmitted via the transmission system simultaneously with the information characters, or can be derived from the information character signal.

For the time being it will be assumed that each information character consists of one bit such as is the case, for example, when Delta modulation is used.

The information buffer unit comprises a local clock 102 having a cycle of one local time interval of the same nominal duration as a line time interval. The series of all local time intervals constitutes the local time scale. Each local time interval is divided into 16 equal sub-time intervals $s_0$, $s_1$, ----,$s_{15}$ as is illustrated in FIG. 2*a*. The local clock generates a sequence of clock signals, the variation with time of which in one local clock cycle is illustrated in the FIGS. 2*b* to 2*n*. All these signals are two-conduction signals. The low level is referred to as the logical level 0 and the high level is referred to as the logical level 1.

The local clock 102 is independent of the line clock 101. The two clocks have the same cycle duration only in a nominal sense. In order to compensate for phase differences between the two clocks, the information characters are first distributed over a group of store locations of a storage device, after which they are transferred from the store locations to an output under the control of the local clock in the same sequence as upon reception. In the buffer units according to the state of the art, the distribution of the information characters over the store locations, i.e., the writing, is controlled by the line clock. The transmission of the information characters from the store locations to the output, i.e., the reading, is effected under the control of the local clock. In order to write and read information characters separate address decoding units are therefore required for selecting the store locations.

In the information buffer unit shown in FIG. 1, a known random access store 103 is used, which is provided with only one address input A. When a binary coded address is supplied to the address input A, a store location is selected in the store. An information bit can be written in this store location by applying a pulse to the input D1 in the case that the information bit has the value 1, or by applying a pulse to the input D2 in the case that the information bit has the value 0. A selected store location presents its information on the output OT so that there the stored information can be read.

The writing and reading of information in the store 103 is effected in different sub-time intervals of the local clock cycle. A line clock pulse has an arbitrary position in the local clock cycle. In each clock cycle two sub-time intervals are assigned as being possible write intervals. A write-interval selector 104 selects a suitable write interval for each character received.

The selection of a write interval will be described with reference to the FIGS. 2 and 3. There are supplied to the write interval selector 104, shown in detail in FIG. 3, the line clock pulses of line clock 101 and the signals P, Q, $S_5$, $S_6$, $S_{13}$ and $S_{14}$ of the local clock. The line clock pulses are applied to the input 300 and the signals of the local clock are applied to the correspondingly denoted inputs. The signals P and Q (FIGS. 2*m* and *n*) are comparison signals. The signal P has the logical level 1 in the sub-time intervals $s_4$, $s_5$, $s_6$ and $s_7$. The signal Q has the logical level 1 in the sub-time intervals $s_{12}$, $s_{13}$, $s_{14}$ and $s_{15}$. The line clock pulses and signal P are applied to AND-gate 301. The line clock pulses and signal Q are applied to AND-gate 302. Hereinafter it will be assumed that the line clock pulses have a maximum pulse duration of one sub-time interval. AND-gate 301 supplies a pulse if the signal P has the logical level 1 at the instant of occurrence of a line clock pulse. The former pulse is applied to the set input of the flip-flop 303 and sets the latter to the state 1. In the case that the line clock pulse occurs when the signal Q has the logical level 1, AND-gate 302 supplies a pulse. This pulse is applied to the reset input of flip-flop 303 and sets the latter to the state 0.

The signals $S_5$, $S_6$ and P are applied to the AND-gates 304, 305 and 306 which are connected to the O-output of flip-flop 303. The signals $S_{13}$, $S_{14}$ and Q are applied to the AND-gates 307, 308 and 309 which are connected to the 1-output of flip-flop 303. When flip-flop 303 is in the state 0, the AND-gates 304, 305 and 306 allow the signals applied thereto to pass, and when flip-flop 303 is in the state 1, the AND-gates 307, 308 and 309 allow the signals applied thereto to pass.

If a varying phase difference exists between the line clock and the local clock, the position of the line clock pulse is shifted with respect to the position of the local time interval. For the purpose of illustration four examples are given in the FIGS. 2*q* and 2*r* of a series of positions in four consecutive local time intervals. In these FIGS. $a_1$, $a_2$, $a_3$, $a_4$; $b_1$, $b_2$, $b_3$, $b_4$; $c_1$, $c_2$, $c_3$, $c_4$ and $d_1$, $d_2$, $d_3$, $d_4$ denote four series of local time interval numbers increasing by unity. In the first example, the line clock has a higher speed than the local clock, and in the second example, the line clock has a lower speed than the local clock. In the time interval number $a_1$, and in the time interval number $b_1$, the line clock pulse coincides with the pulse of signal P, FIG. 2*m*. After the occurrence of the line clock pulse flip-flop 303 has the state 1 in any case. The write interval selector 104 then selects the signals $S_{13}$, $S_{14}$ and Q, the signal $S_{13}$ acting as a write-control signal. The signal $S_{13}$ controls the writing of an information bit in the write interval $s_{13}$. In the local time intervals $a_2$, $a_3$, $a_4$ and $b_2$, $b_3$, $b_4$ the state of flip-flop 303 does not change, so that in these local time intervals the writing is also effected in the sub-time interval $s_{13}$. This remains the case for as long as the clock pulses remain inside the shaded area of FIG. 2*o*. Within this area the signal Q has the logical level 0, so that gate 302 is blocked and flip-flop 303 cannot be set to the state 0. In the third and the fourth example, the line clock pulse coincides with the pulse of signal Q in the local time interval number $c_1$ and the local time interval number $d_1$. After the occurrence of the line clock pulse flip-flop 303 has the state 0 in any case. The write interval selector 104 then selects the signals $S_5$, $S_6$ and P, the signal $S_5$ acting as a write-control signal. The signal $S_5$ controls the writing of an information bit in the sub-time interval $s_5$. In the third example, the line clock has a higher speed than the local clock, and in the fourth example, the line clock has a lower speed than the local clock. The state of flip-flop 303 does not change in the local time intervals $c_2$, $c_3$, $c_4$ and $d_2$, $d_3$, $d_4$ so that in these local time intervals the writing is also effected in the sub-time interval $s_5$. This remains the case for as long as the line clock pulses remain inside the shaded area of FIG. 2*p*. Within this area the signal P has the logical level O so that gate 301 is blocked and the flip-flop 303 cannot be set to the state 1. Flip-flop 303 changes over when the line clock pulse coincides with the pulse of signal P and the flip-flop was in the state O (changeover from 0 to 1), or when the line clock pulse coincides with the pulse of signal Q and the flip-flop was in the state 1 (changeover from 1 to 0). No changeovers occur in the areas between the pulses of the signals P and Q. The state of the flip-flop 303 at the occurrence of line clock pulses in these intermediate areas depends on the fact whether the line clock pulse coincided with the pulse of signal P, or with the pulse of signal Q prior to entering the intermediate area. The state of flip-flop 303 as a function of the phase of the line clock pulse with respect to the local clock cycle, therefore, shows hysteresis. This hysteresis ensures stable selection of the write interval in the presence of small fluctuations in the instants of occurrence of the line clock pulses.

The write interval selector 104 selects a write interval for each bit originating from the source 100.

If a phase difference varying with time exists between the line clock and the local clock, changeovers are effected by the write interval selector 104 such that the sequence of clock pulses on output $S_5/S_{13}$ (second control signal) is synchronous with the bit sequence. As a result of the changeovers, this sequence of clock pulses shows phase transitions of one-half local time interval, i.e., 180°, in the positive and/or the negative direction. The phase difference between the sequence of clock pulses an output $S_5/S_{13}$ and the line clock pulses varies between two limit values, which differ by one-half local time interval, i.e., 180°, and hence are mutually synchronized.

The outputs of the gates 304 and 307, 305 and 308, and 306 and 309 are combined in pairs to form three outputs. The output $S_5/S_{13}$ of write-interval selector 104, FIG. 1, is connected to an input of each of the sense gates 105 and 106, the outputs of which are connected to the digit inputs D1 and D2 of the store 103. The output of source 100 is connected to an input of AND-gate 105 and is connected to an input of AND-gate 106 via a NOT-element 107. The source thus applies signals having opposed levels to the two AND-gates 105 and 106. In the selected write interval the AND-gates 105 and 106 sense the value of the bit supplied by the source. For this it is assumed that the logical level representing the value of the bit is present on the output of the source during the entire line time interval. The result of the sensing is a pulse on digit input D1 if the bit has the value 1, and a pulse on digit input D2 if the bit has the value 0.

The output $S_6/S_{14}$ of write interval selector 104 is connected to the counting input of a modulo-$n$ address counter 108, where $n$ represents the number of store locations of the store 103. Each pulse applied to the counting input sets the address counter to a next position, the counter passing cyclically through a sequence of $n$ positions. The position of the counter is indicated on the output 109 in a binary code in a parallel form. The output 109 is connected to the multiple input of a multiple AND-gate 110, the single input of which is connected to the output P/Q of write-interval selector 104. The output of AND-gate 110 is connected to the address input A of the store 103. The signal P or Q actuates the AND-gate 110 when the signal has the logical level 1, so that AND-gate 110 allows the address of address counter 108 to pass in a time interval (FIG. 2$m$ and $n$) covering the selected write interval. As a result, the bit sensed by the AND-gates 105 and 106 is written in the store location, the address of which corresponds to the position of address counter 108. After the bit has been written in store 103, the address counter 108 is set to the next position by the pulse of signal $S_6$ or $S_{14}$. The store locations of store 103 are thus selected cyclically and in a fixed sequence for storing the bits from source 100.

For reading the bits stored in the store 103, the information buffer unit shown in FIG. 1 comprises a read-interval selector 111 and a modulo-$n$ address counter 112. The local clock 102 applies the clock signals $S_1$, $S_2$, $S_9$ and $S_{10}$ to the read-interval selector and the read-interval selector selects the signals $S_1$ and $S_2$ or the signals $S_9$ and $S_{10}$, depending on given conditions. The output $S_1/S_9$ of read-interval selector 111 is connected to an input of each of the AND-gates 113 and 114, the outputs of which are connected to the set input and the reset input of a flip-flop 115. The output OT of store 103 is connected to an input of AND-gate 113 and is connected, via a NOT-element 116, to an input of AND-gate 114. The output OT thus applies signals having opposed levels to the AND-gates 113 and 114. In the selected write interval $s_1$ or $s_9$ these AND-gates sense the value of the bit supplied by the store 103. This sensing produces a pulse on the set input of flip-flop 115 if the bit has the value 1, and a pulse on the reset input of flip-flop 115 if the bit has the value 0. Flip-flop 115 regenerates the sensed bit and presents it on the output 117 of the information buffer unit.

The output $S_2/S_{10}$ of read-interval selector 111 is connected to the counting input of address counter 112. Each pulse of signal $S_2$ or $S_{10}$ sets the counter to the next position, the counter thus passing cyclically through a sequence of $n$ positions. The position of the address counter is presented in a binary code and in a parallel form on the multiple output 119. This output is connected to the multiple input of a multiple AND-gate 118, the single input of which is connected to the output $S_1/S_9$ of read-interval selector 111. The output of AND-gate 118 is connected to the address input of store 103. The signal $S_1$ or $S_9$ actuates the AND-gate 118 in the selected read interval. As a result, a store location is selected whose address corresponds to the position of address counter 112. After the bit has been read from the selected store location, the address counter 112 is set to the next position by the pulse of signal $S_2$ or $S_{10}$. The store locations are thus selected cyclically and in a fixed sequence for transferring a bit to output 117. The address counter 112 passes through the $n$ positions in the same sequence as address counter 108, so that the sequence of the bits is retained while passing through the information buffer unit.

If the line clock has a higher speed than the local clock and the store 103 is read in a fixed write interval, for example, the sub-time interval $s_1$, the store 103 will become ever fuller. The opposite is the case if the line clock has a lower speed than the local clock. The store 103 will then become evermore empty. Difficulties may arise if the store is full or empty. If the store is full and the address counter 108 catches up with the address counter 112, new bits will be written on the $n$ bits which have not yet been read. As a result, these $n$ bits are lost. If the store is empty and the address counter 112 catches up with the address counter 108, $n$ bits which have been read once already will be read again. In that case a series of $n$ bits is doubled at output 117. It is assumed that reading is non-destructive. If reading is destructive, such as in the case of magnet core stores, a series of $n$ bits having the value 0 is read.

If the cycle of address counter 112 has shifted 180° in phase with respect to the cycle of address counter 108 at a given instant, the information buffer unit can fully compensate for relative positive and negative phase differences between the line clock and the local clock of maximum $n$. 180°. In the case of a phase difference of 180° between the cycle of address counter 112 and the cycle of address counter 108, the store 103 contains $n/2$ bits which have not et been read. In that case the store can still accommodate or supply $n/2$ bits before it is full or empty, respectively. These $n/2$ bits represent a relative phase difference of $(n/2)$ 360° between the line clock and the local clock, so that a phase difference of no more than $(n)$ 180° is fully compensated for.

When the buffer unit is put into operation, it can be ensured that the address counter 112 is started at a phase difference of 180° with respect to address counter 108. This guarantees that after putting into operation no bits are lost or are read twice, provided that the phase difference between the two clocks remains smaller than $(n)$ 180°. In telecommunications networks of the type which is called "asynchronous," the clocks of the telecommunication exchanges are fully independent of each other, and it is virtually impossible to compensate for the entire phase difference in a buffer unit. In any case it is advantageous when the mean phase of address counter is shifted 180° with respect to address counter 108. This can be achieved by making the address counter 112 perform an extra step when the store is almost full, and by making the address counter 112 delete a step when the store is almost empty. In the first case, a bit is skipped during reading, and in the second case a bit is read twice. By a suitable choice of the instant at which the address counter performs an additional step it can be achieved that only predetermined bits are skipped. By ensuring that these bits transmit only redundant information, it can be achieved that no information loss occurs in the buffer unit. This method requires some sort of frame synchronization to enable unambiguous identification of the bits.

The additional steps and/or deleted steps of address counter 112 ensure that the phase of address counter 112 with respect to address counter 108 always remains within the range between 0° and 360°, and averages 180° over a prolonged period of time. This result can also be achieved in another manner. For this purpose, two sub-time intervals in each local time interval are designated as being possible read intervals, in this case the sub-time intervals $s_1$ and $s_9$. Furthermore, signals V and L are generated, the signal V having the logical level 1 when the store is almost full and the signal L having the logical level 1 when the store is almost empty. The generation of the signals V and L will be described hereinafter. First a detailed embodiment of the read-interval selector 111 and its operation under the control of the signals V and L and the clock signals will be described with reference to FIG. 4.

The signals $S_1$ and $S_2$, FIG. 4, are applied to an input of the AND-gates 400 and 401, respectively, one input of each of which is connected to the 0-output of a flip-flop 404 which is connected as a 2-to-1 divider. The signals $S_9$ and $S_{10}$ are applied to an input of the AND-gates 402 and 403, respectively, one input of each of which is connected to the 1-output of flip-flop 404. The AND-gates 402 and 403 are active in the state 1 of flip-flop 404 and the signals $S_9$ and $S_{10}$ are allowed to pass. The AND-gates 400 and 401 are active in the state 0 of flip-flop 404 and the signals $S_1$ and $S_2$ are allowed to pass. The outputs of the AND-gates 400 and 402 are combined to form the output $S_1/S_9$ (output for the first control signal), and the outputs of the AND-gates 401 and 403 are combined to form the output $S_2/S_{10}$.

The signal L is applied to the AND-gates 405 and 406, and the signal V is applied to the AND-gates 407 and 408. The outputs of these AND-gates are connected, via an OR-gate 409, to the input of flip-flop 404. As flip-flop 404 is connected as a 2-to-1 divider, it will change its state each time that the input signal changes over from the logical level 0 to the logical level 1. One input of each of the AND-gates 405 and 408 is connected to the 0-output of flip-flop 404, and one input of each of the AND-gates 406 and 407 is connected to the 1-output of flip-flop 404. Furthermore, the signal $S_7$ is applied to an input of the AND-gates 406 and 408, and the signal $S_{15}$ is applied to an input of each of the AND-gates 405 and 407.

The conditions to be fulfilled for obtaining the logical level 1 at the outputs of the AND-gates 405, 406, 407 and 408 are given in the below table. In this table the reference FF denotes the state of flip-flop 404 before the logical level 1 occurs and, for example, L = 1 means that the signal L has the logical level 1.

TABLE I

| AND-gate | Conditions |
|---|---|
| **405** | L = 1, FF = 0, $S_{15}$ = 1 |
| **406** | L = 1, FF = 1, $S_7$ = 1 |
| **407** | V = 1, FF = 1, $S_{15}$ = 1 |
| **408** | V = 1, FF = 0, $S_7$ = 1. |

The state of flip-flop 404 is changed-over if for one of the AND-gates mentioned in the table all conditions stated adjacently are fulfilled. In the first two cases given in the table the change-over of flip-flop 404 is effected such that the distance between the read-interval selected before and after the changeover amounts to three-halves of the local time interval. In the last two cases given in the table, the changeover is effected such that this distance amounts to one-half of the local time interval. In the first two cases reading is temporarily delayed by one-half local time interval, and in the last two cases reading is temporarily accelerated one-half local time interval. This delay acceleration of the reading produces the desired correction of the phase of address counter 112 without information being lost or without information being doubled. In order to make a clock signal available at the output of the information buffer unit which is synchronous with the bit sequence appearing at output 117, the output $S_1/S_9$ of write-interval selector 111 is connected to the clock output 118.

The signals V and L are generated as follows. Connected to the output 109 of address counter 108 is a decoder 120 for the number 0. This decoder supplies a signal having the logical level 1 when address counter 108 is in the position 0. Connected to the output 119 of address counter 112 are a decoder 121 for the numbers 0, 1 and 2, and a decoder 122 for the numbers 30 and 31. It is assumed that the store 103 comprises 32 store locations and that the address counters 108 and 112 are modulo-32 counters. The three outputs of the decoder 121 are combined, via an OR-gate 123, to form one output. The latter output supplies a signal having the logical level 1 when address counter 112 is in position 0, 1 or 2. The two outputs of decoder 122 are combined, via an OR-gate 124, to form one output. The latter output supplies a signal having the logical level 1 when address counter 112 is in position 30 or 31. The output of decoder 120 is connected to an input of an AND-gate 125, another input of which is connected to the output $S_5/S_{13}$ of the write-interval selector 104. As a result, a signal having the logical level 1 in the last sub-time interval of the time interval of occurrence of position 0 of address counter 120 is obtained at the output of the AND-gate 125. The pulses of this signal are referred to as A-pulses. In an analogous manner, the pulses of the signal on the output of OR-gate 123 are referred to as $B_1$-pulses, and the pulses of the signal on the output of OR-gate 124 are referred to as $B_2$-pulses.

The output of AND-gate 125 is connected to an input of each of the AND-gates 126 and 127, the outputs of which are connected to the set inputs of the flip-flops 128 and 129. Furthermore, one input of the AND-gates 126 and 127 is connected to the outputs of the OR-gates 123 and 124. The 1-outputs of the flip-flops 128 and 129 supply the desired signals V and L.

For the description of the operation it is assumed that at a given instant the phase of address counter 112 shifted 180° with respect to the phase of address counter 108. An A-pulse is then situated approximately midway between a $B_1$-pulse and a $B_2$-pulse. If the speed of the line clock is higher than that of the local clock, the A-pulses are shifted in the direction of the $B_1$-pulses, and the store 103 becomes ever fuller. If coincidence occurs between an A-pulse and a $B_1$-pulse, AND-gate 126 is actuated and flip-flop 128 is set to the state 1. However, if the speed of the line clock is lower than that of the local clock, the A-pulses are shifted in the direction of the $B_2$-pulses and the store 103 becomes evermore empty. If coincidence occurs between an A-pulse and a $B_2$-pulse, AND-gate 127 is actuated and flip-flop 129 is set to the state 1. If the signal V or L has the logical level 1, a changeover between the two possible read intervals is effected in the read-interval selector 111, FIG. 4. At the same time, a reset pulse is applied to the output RS via OR-gate 409. This output, FIG. 1, is connected to the reset inputs of the flip-flops 128 and 129. After each changeover in read-interval selector 111, a reset pulse is supplied which resets the flip-flop 128 or 129 to the state 0, depending upon which flip-flop has the state 1. The correction of the phase of address counter 122 cancels the state of coincidence between the A-pulse and the $B_1$-pulse or the $B_2$-pulse. In special cases, for example, when the A-pulse coincides with the first portion of the $B_1$-pulse when the equipment is switched on, two correction steps may be required for terminating the state of coincidence.

If *m*-bit characters are to be processed in parallel form only the block indicated in FIG. 1 by a broken line is to be provided in *m*-fold. These *m*-blocks are then connected in parallel in accordance with the multiple marks inserted in the supply lines for the control signals. It is, of course, advantageous if instead of *m* independent stores 103, one store consisting of *m* storage planes and having one common address decoding unit is used.

What is claimed is:

1. An information buffer unit for converting a received sequence of information characters which is synchronous with a received clock signal into a sequence which is synchronous with a first control signal derived from an independent clock, comprising a group of store locations, in each of which an information character can be stored, a first selective transmission unit, comprising a first cyclic address generator which selects the store locations in the same sequence in each cycle and which transmits the information characters of the received sequence of information characters to the selected store locations, a second selective transmission unit, comprising a second cyclic address generator which selects the store locations in each cycle in the same sequence as the first cyclic address generator and which transmits the information characters from the store locations to an output of the information buffer unit, a first control unit which controls the first selective transmission unit and a second control unit which derives the first control signal from the clock in order to control the second selective transmission unit, said first control unit deriving a second control signal from the clock in order to control the first selective transmission unit and having a first phase-comparison unit which compares the phase of the received clock signal with the phase of the second control signal, and a phase-correction unit which introduces, in dependence upon the phase difference detected by the first phase-comparison unit, discrete variations in the phase of the second control signal, so as to keep the phase difference between the second control signal and the received clock signal within given limits.

2. An information buffer unit as claimed in claim 1, wherein the second control unit comprises a second phase-comparison unit which compares the phase of the first cyclic address generator with the phase of the second cyclic address generator and a phase-correction unit which introduces, in dependence upon the phase difference detected by the second phase-comparison unit, discrete variations in the phase of the first control signal derived by the second control unit so as to keep the phase difference between the first and the second address generators within given limits.

3. An information buffer unit as claimed in claim 2, wherein the first and the second selective transmission units have one common address decoding unit for selecting the store locations.

* * * * *